United States Patent [19]

Chambers et al.

[11] Patent Number: 5,867,485
[45] Date of Patent: Feb. 2, 1999

[54] LOW POWER MICROCELLULAR WIRELESS DROP INTERACTIVE NETWORK

[75] Inventors: Craig Brent Chambers, Stockbridge; Richard Sammis Bergen, Roswell, both of Ga.

[73] Assignee: BellSouth Corporation, Atlanta, Ga.

[21] Appl. No.: 663,651

[22] Filed: Jun. 14, 1996

[51] Int. Cl.[6] .................................................... H04J 15/00
[52] U.S. Cl. ........................................... 370/281; 370/486
[58] Field of Search ...................... 348/6, 7, 12; 370/315, 370/328, 329, 338, 343, 486, 487, 395, 389, 281, 276, 277, 278, 280, 282, 320, 337, 347, 344, 464, 465, 442, 480, 485, 499; 455/3.1, 4.2, 5.1, 3.2, 3.3, 4.1, 6.1, 6.2; 375/217, 261, 298

[56] References Cited

U.S. PATENT DOCUMENTS

| | | |
|---|---|---|
| 4,061,577 | 12/1977 | Bell . |
| 4,747,160 | 5/1988 | Bossard .................................. 455/422 |
| 5,303,229 | 4/1994 | Withers et al. . |
| 5,369,779 | 11/1994 | Moreland . |
| 5,394,559 | 2/1995 | Hemmie et al. . |
| 5,402,138 | 3/1995 | Hulett et al. ............................. 343/840 |
| 5,437,052 | 7/1995 | Hemmie et al. . |
| 5,485,221 | 1/1996 | Banker et al. ........................... 348/563 |
| 5,559,808 | 9/1996 | Kostreski et al. ...................... 370/517 |
| 5,592,470 | 1/1997 | Rudrapatna et al. ................... 370/320 |
| 5,610,916 | 3/1997 | Kostreski et al. ...................... 370/487 |
| 5,644,622 | 7/1997 | Russell et al. .......................... 455/422 |
| 5,659,353 | 8/1997 | Kostreski et al. ....................... 348/21 |
| 5,666,365 | 9/1997 | Kostreski ................................ 370/486 |
| 5,697,053 | 12/1997 | Hanly ..................................... 455/33.1 |

FOREIGN PATENT DOCUMENTS

WO 94/24783  10/1994  WIPO .
WO 95/25409  9/1995  WIPO .

OTHER PUBLICATIONS

Fan J.C. et al., "Design and Analysis of a Novel Fiber–Based PCS Optical Network," IEEE, Jun. 18, 1995.

Ogawa, H., et al., "Cascaded External Optical Modulation Link for Radio Distribution," IEEE, May 23, 1994.

Comerford and Perry, "Wired for Interactivity. The trials and travails of Interactive TV," *IEEE Spectrum*, 22–28 (Apr., 1996).

Husted, "BellSouth makes $12 million bid for New Orleans cable license," *Atlanta Journal* (Apr. 25, 1996).

Weiss, S. Merrill, *Issues in Advanced Television Technology*, Focal Press, pp. 209–222, Boston (1996) (Articles first published in 1993).

*Primary Examiner*—Dang Ton
*Attorney, Agent, or Firm*—Marcus Delgado, Esq.; James L. Ewing, IV, Esq.; Kilpatrick Stockton LLP

[57] ABSTRACT

Microcellular low power wireless networks for interactive, full duplex communication of video, data and telephony signals at microwave frequencies. Networks according to the present invention link a number of remote node transceivers to a central head office via fiber optic link. The remote node transceivers convert optical signals to radiofrequency energy in the microwave (preferably MMDS) range for robust and reliable communications that can, among other things, support basic lifeline telephone service. Low power and cross polarization techniques according to the present invention, together with modulation and multiplexing techniques, allow the limited bandwidth allotted in conventional microwave bands to accommodate analog and digital video, video on demand, data communications including graphics-rich internet traffic, and voice and digital telephony, in a full duplex, bi-directional fashion.

27 Claims, 5 Drawing Sheets

LOW POWER MICROCELLULAR WIRELESS DROP INTERACTIVE NETWORK

FIELD OF THE INVENTION

The present invention relates to the general field of telecommunications, and in particular to microcellular wireless networks for interactive television, data and telephony communications.

BACKGROUND OF THE INVENTION

A number of networks have been developed and are being developed for delivery of interactive television, data and telephony services. A variety of delivery architectures, structures and mechanisms permit a wide range of functionality. For example, some networks, which offer only limited interactivity, employ existing coaxial cable infrastructure plus existing telephone lines for return path communications (upstream). Other networks employ Asymmetrical Digital Subscriber-Line ("ADSL") technology which forwards compressed digital video signals over existing twisted pair telephone lines at up to two Mb/s. A third broad category, the hybrid network, employs fiber optic links between the headend and a number of nodes which service neighborhoods of approximately 500 homes, and which connect to subscribers via coaxial cable links. In a fourth broad category, known as fiber-to-the-curb, fiber optic links pass the subscribers more closely and connect to subscribers via twisted pair loops. Fiber-to-the-curb networks are more expensive than the hybrid and ADSL networks, but are generally considered more robust and capable of accommodating greater interactivity because they are capable of accommodating greater bandwidth.

All of these fiber/coaxial/twisted pair networks and various versions of them involve physical cable plant to the home and thus considerable infrastructure investment, installation lead time, community disruption and customer annoyance. In addition, the cost of serving a customer is primarily a capital intensive sunk cost up front, since customers must be passed to be served. As existing cable designs demonstrate, systems without a substantial penetration and customer acceptance cannot be justified economically.

Such physical links also degrade over time due in part to moisture, temperature and flexure excursions, and the inherent environmental risks on the pole and in the ground. Such degradation can impose considerable efficiency losses over time, particularly as content suppliers require increasingly greater bandwidth capacity and efficiency.

Some see so-called "wireless cable" as a potential response to these issues presented by physical network infrastructures. Apart from the long lead time and expense required to pass hundreds of thousands of homes with wire line networks, wireless cable is impervious to physical degradation. In a conventional network topology, the "last mile" to the customer's home multiplied by the number of subscribers in the network comprises the vast proportion of the physical cable plant. Accordingly, replacement of that cable with wireless communications has received increasing attention in recent years.

One version of "wireless cable" networks is so called Multichannel Multipoint Distribution Service ("MMDS"). MMDS operates in the 2.1–2.7 Ghz microwave band, with a total of 33 analog 6-Mhz channels. Digital compression allows such MMDS networks with 33 analog channels to transport 100 to 180 digital programs. One entrant in the field has investigated combining MMDS with a telephone line return path for near video on demand capability. As a practical matter, it is apparent that with POTS return, full interactivity is probably not and never will be deployable due to the signaling logistics of TCP/IP networks.

Conventionally, however, MMDS has been viewed as providing insufficient bandwidth for full duplex interactive communications. Accordingly, certain entrants have investigated so called Local Multipoint Distribution Systems ("LMDS"). These operate at approximately 28 Ghz and follow the model of the cellular telephone. The high frequencies and concomitant greater bandwidth are tradeoffs for shorter transmission paths and thus smaller cell sizes. The higher frequencies also subject such networks to increased attenuation from foliage, weather, and other physical manifestations which obstruct the required line of sight path between the node and the subscriber station. In short, LMDS networks are viewed by some as lacking the robust RF link necessary to support emerging residential interactive video, data and telephony communications requirements which customers are demanding and which are becoming part of the required suite of services offered by entrants in this field. In order to obtain critical mass for coverage, LMDS cell sites would, at least in many parts of the country, be entirely too close to each other to be commercially and economically justified.

SUMMARY OF THE INVENTION

Systems, methods and devices according to the present invention provide a practical implementation of wireless delivery of services including interactive video, data and voice-grade telephony. Network interfaces and delivery platforms according to the present invention replace the fiber/coaxial/twisted pair drop, or "last mile" of copper plant in the ADSL, coaxial, hybrid and fiber to the curb wireline networks mentioned above. Low power Microcellular Wireless Drop ("MWD") networks according to the present invention provide an economically attractive alternative to the high cost of coaxial distribution plant which is currently deployed en masse, as well as twisted pair and fiber links. Likewise, MWD architecture allows for service to be connected from a point further away from the customer, such that the target population does not need to be "passed" to be served. This transfers most of the capital intensive cost to serve a customer into a much more variable cost structure, so that it only requires a major capital investment once a subscriber is signed up for service. This is obviously very attractive in light of the major investment required to build the full service network. Unlike current MMDS networks, they use MMDS frequencies, but in a low power, microcellular way that allows for interactivity of the sort demanded by customers and content providers. Unlike LMDS networks, they allow for increased robustness in radiofrequency transmissions at lower frequencies, which permits more reliable telephony signaling and communication so as to approximate the basic lifeline requirements to which at least some of such signaling and communication must comply.

The present invention takes advantage of existing allocated frequency spectrum which is currently authorized and in use both domestically and internationally for broadcast video services, and specified as MMDS. The spectrum consists of two bands that are spectrally separate in the frequency ranges of 2150–2162 MHz and 2500–2686 MHz. The bands are allocated for video broadcasting in 6 MHz channels (domestically) to be consistent with current NTSC compliant television channels. The present invention employs a different plan, however: That the lower frequency band of 2150–2162 be converted to an upstream back channel for full-duplex bi-directional capability, and that signals on the higher frequency bands be modulated and multiplexed in new ways to permit analog video, digital video, internet, analog voice, digital voice, and other signals of present and future existing formats and protocols to be handled with maximum flexibility, robustness and reliability.

Figure 1:
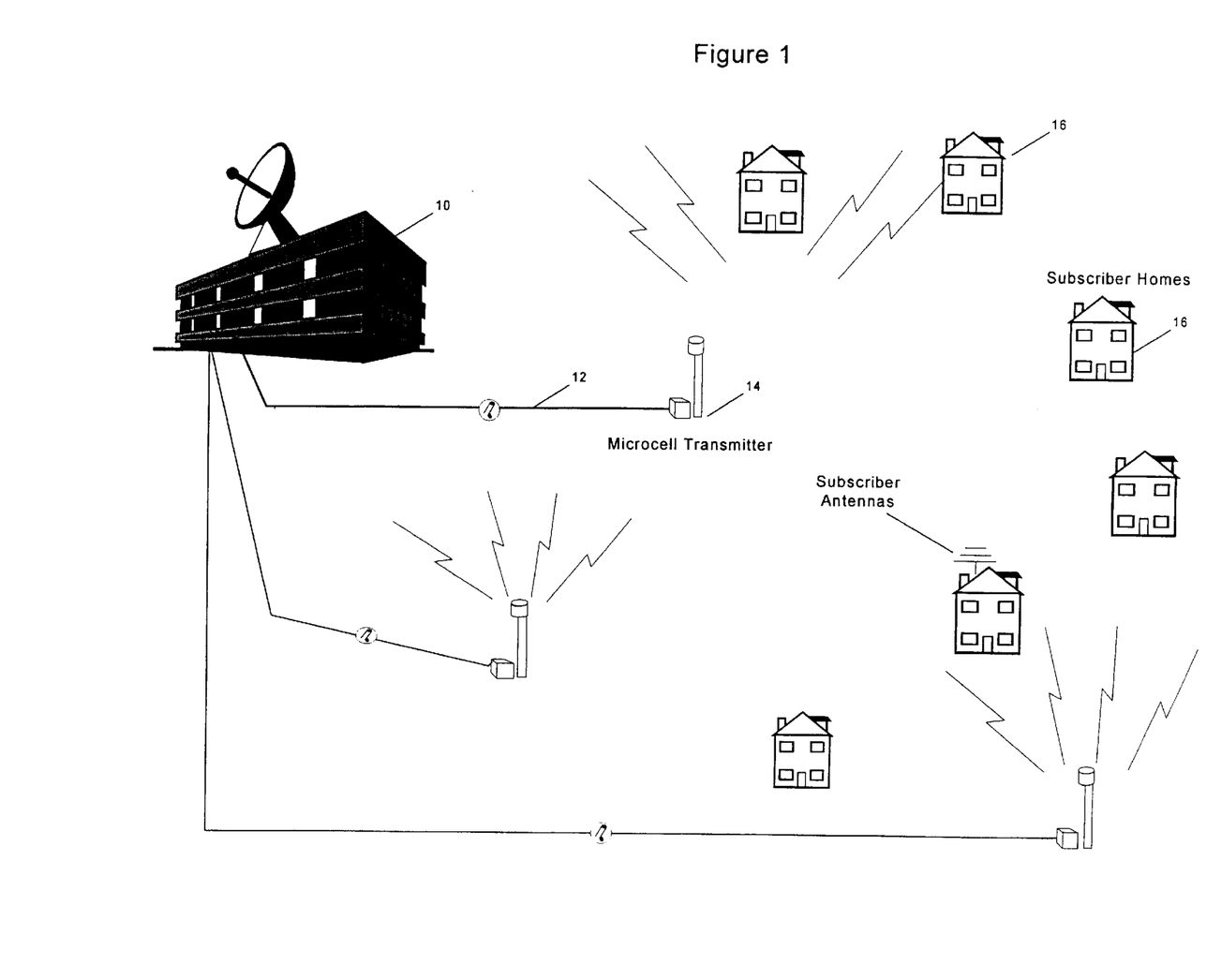
FIG. 1 is a schematic high level architectural diagram of a preferred form of wireless cable network according to the present invention.

Systems according to the present invention use networks of low power microwave transceivers in a point-to-multipoint configuration to connect a number of subscribers (preferably in the range of 10–100) to a broadband bi-directional service platform. FIG. 1 shows, in schematic form, a network architecture according to a preferred embodiment of the invention. Such transceivers are connected to a fiber optic infrastructure which may be similar or identical to the fiber feeder layout of the conventional hybrid fiber/coaxial networks mentioned above. They are sufficiently small to mount on existing poles such as light poles, power poles, and utility poles. These remote node transceivers convert the modulated and channelized combined optical signal to an electrical radiofrequency ("RF") signal and broadcast that signal to a number of subscribers located within a defined coverage area of preferably 1000–2000 feet. The microcells are cross-polarized between adjacent cells, or if desirable, between adjacent sectors of a given cell, to mitigate harmful interference.

The subscriber station features an integrated antenna/transceiver that receives video, digital and telephony signals, downconverts them to an intermediate frequency, and feeds them via coax to a Home Distribution Terminal ("HDT") or Network Interface Unit ("NIU"). The transceiver equipment is preferably mounted at roof level to allow for best reception of signal from the remote node transceiver. The HDT is a component that is similar to current state-of-the-art digital set-top decoders, yet also allows termination/distribution in the subscriber's house of digital voice and data traffic. Likewise, the NIU demultiplexes and splits the incoming signals at a common point (i.e. the house entry point) and distributes those signals to the necessary equipment.

To accommodate full duplex bi-directional interactive communications, the subscriber station equipment, preferably but not necessarily the HDT or NIU, combines or multiplexes the upstream data and voice channels so that the information can be sent back upstream in the network. In addition to the remote node transceiver's downstream broadcast functionality, the transceiver also includes equipment for the reception of the upstream data and telephony traffic. The transceiver forwards this upstream traffic over fiber to the headend, where the signal is split into data and telephony components and routed to the proper path.

A band split plan according to a preferred embodiment of the present invention is outlined below in Table 1. This table shows how the video, data and telephony signals may be split up and modulated separately to obtain the required performance results for each service. The higher density modulation schemes (64, 256 QAM and 16, 64 VSB) allow much higher throughput of bits, although they lack the robustness from a propagation perspective of schemes such as QPSK and are substantially more susceptible to noise and interference. Lower density modulations such as BPSK and QPSK offer much more reliability under the same environmental parameters but accommodate much less data throughput capability. Thus, for video, where the number of video channels is a critical factor, higher level modulations are desirable. However, voice circuits that can approximate non-interruptible "life-line" service is achievable using lower level modulations that sacrifice capacity for reliability. With the broad 6 MHz bandwidth allowed, this capacity even at BPSK modulation would likely never be limiting due to the limited geographical coverage of the microcell. In fact, with QPSK modulation and Time Division Multiple Access (TDMA) for time slot assignment, and using 2 channels in each direction (i.e. 2674–2686 MHz down and 2150–2162 MHz up) in conjunction with currently available low-cost 32 kb/s ADPCM vocoder IC's, a total of 320 simultaneous voice grade circuits is achievable. Assuming two of those circuits are used for control and signaling, a total of 318 simultaneous voice grade circuits are available. Conservatively assuming a peak utilization of 50% (2 subs per circuit) a total of 636 subscriber lines are available. With 16 kbps vocoder technology quickly becoming available with perceptually the same voice quality, this number doubles to 1272 subscriber lines per microcell. The telephony circuits employ both Frequency Division Multiplexing (FDM) to separate upstream/downstream transmission paths and TDMA between users to maximize efficiency and keep costs low. The low costs derive from the fact that both transceivers (node and subscriber) can use low-cost diplexer/filter circuitry that offer sufficient isolation between the incoming and outgoing signals.

TABLE 1

Example of Frequency Plan

| Service Type | Modulation | Frequency |
| --- | --- | --- |
| Video | 64, 256 QAM | 2500–2674 |
| Voice\Telephony (Downstream) | QPSK | 2674–2680 |
| Data (Downstream) | 64, 256 QAM | 2680–2686 |
| Voice\Telephony (Upstream) | QPSK | 2150–2156 |
| Data (Upstream) | QPSK | 2156–2162 |

In addition, due to the close proximity of the spectrum to Personal Communication Systems ("PCS"), it is conceivable that the same type of transmission and receiver components could be easily modified for use with the present invention. This could lead to implementation of CDMA, OFDM, GSM or TDMA type transmission multiplexing of signals. Since standards are already agreed on for PCS implementation, such techniques appear logical and favorable for application in this case. This is especially true for the emerging wireless local loop equipment that is fixed vs. mobile.

DETAILED DESCRIPTION

FIG. 1 shows, in schematic form, a headend control office 10 connected via fiber optic links 12 to a plurality of remote node transceivers 14. Transceivers 14 convert optical energy into radiofrequency energy, in the microwave, and preferably the MMDS bands, for transmission to subscriber stations 16, each of which may correspond to a subscriber's home. Transceivers 14 also receive transmissions at microwave, preferably MMDS, frequencies from subscriber stations 16, and convert such energy to optical energy for forwarding to headend control office 10 via fiber optic links 12, thus allowing the network to provide full duplex bi-directional interactive video, data and telephone (voice or otherwise) communications.

Headend Control Office

Figure 2:
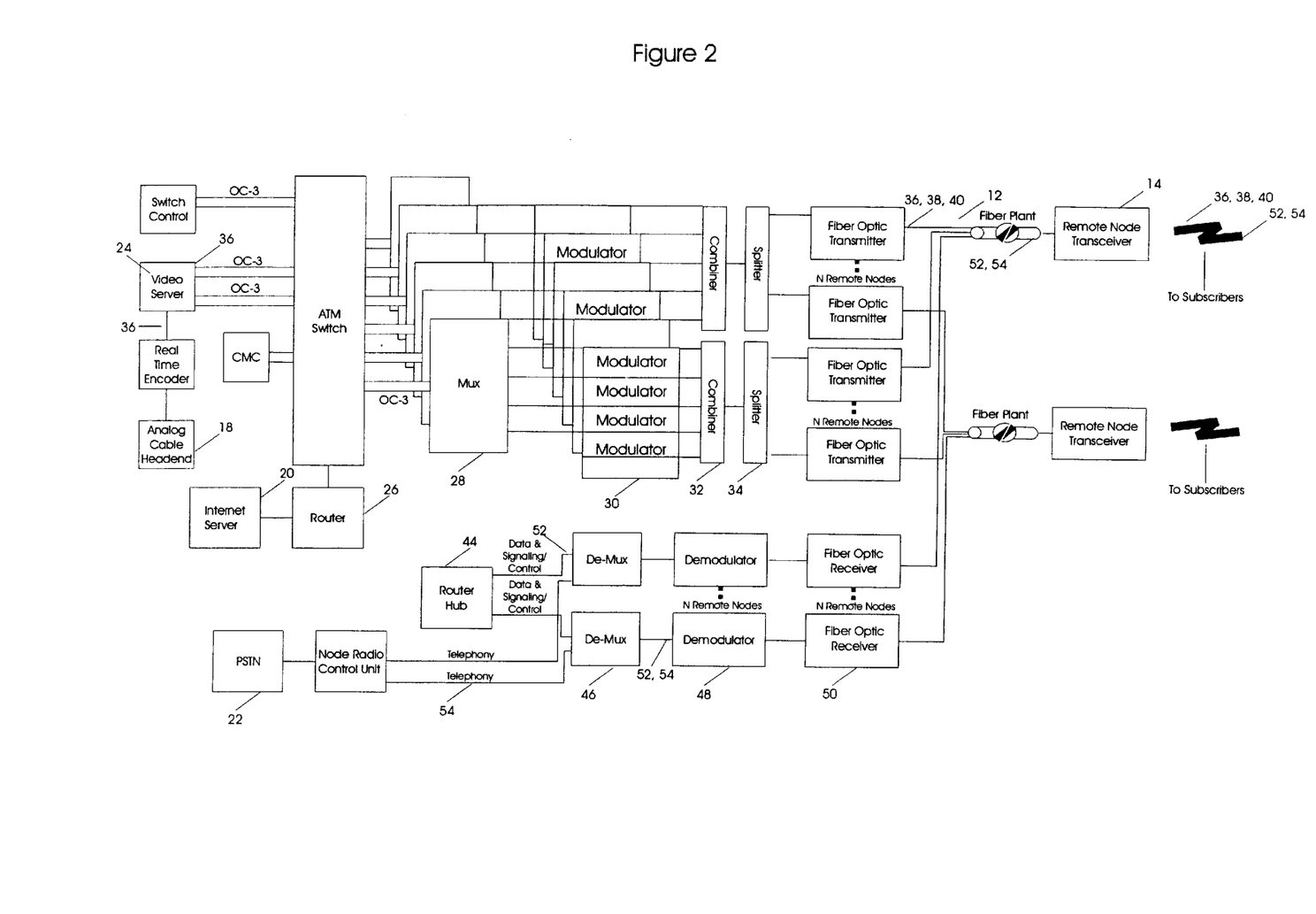
FIG. 2 is a schematic view of a preferred embodiment of a headend control office according to the present invention.

With reference to FIG. 2, the Headend Control Office ("HCO") 10 includes all centrally located signal processing equipment in the network. Typically, the HCO includes all components in the video delivery chain such as satellite decoders and transcoders, off-air receivers, real-time digital encoders and other components conventionally found in a cable headend (shown using numeral 18 in FIG. 2). It also includes internet and other network servers 20 as may be appropriate, and preferably includes public switched telecommunications network ("PSTN") interconnects 22 for telephony capability. Video servers 24 may be included to store and provide video on demand and other video content as required or requested by subscribers using the network. Routers 26, digital multiplexers 28, modulators 30, combiners 32, splitters 34 and other (or fewer) components are employed as may be necessary or appropriate to prepare the video signals 36, data signals 38 and telephony signals 40 for transmission to remote node transceivers 14 via fiber optic links 12 using fiber-optic transmitters 36. In addition, the HCO 10 may house components such as the channel management control computer 42, data routers 44 as desired, demultiplexers 46, demodulators 48 and return path fiber optic receivers 50 for processing subscriber data signals 52 and subscriber telephony signals 54.

Broadcast video signals 36 may be received through any of a number of sources as mentioned above, including satellite receivers and off the air receivers, MPEG II or otherwise digitally encoded (if analog), groomed and configured in the multiplexer 28, modulated and channelized onto an RF carrier, combined with other channels, split (for transmission to other node transceivers 14) and sent over fiber optic plant 12 to the remote node transceivers 14. The combining process after RF may be done on a non-adjacent carrier basis, as is currently the norm for a high power MMDS transmitter. If not combined on adjacent channels, dual fiber feeders are required. The fibers may be optically excited using state-of-the-art Externally Modulated Distributed Feedback (DFB) laser transmitters. DFB's allow extremely broadband RF signals to be optically modulated with the most efficiency, and hence allow for the entire spectrum of downstream voice, data and telephony to be carried on a single fiber. This ensures that low cost can be maintained throughout the network since the F/O transmitters are generally the most expensive single component in the transmission network.

To allow for interconnection to the Telephone Network in order that subscribers may be provided telephone service, a Node Radio Control Unit (NRCU) according to the present invention provides time slot management to the individual voice circuits and handle the contention management protocols such as slotted aloha. Communication between the Remote Node Transceiver and the individual subscriber terminals may be performed via an overhead channel within the downstream and upstream RF channels. These types of devices are readily available in most wireless digital voice networks such as PCS, PACS.

Remote Node Transceivers

The low-cost remote node transceiver 14 connects to the bi-directional fiber optic links 12 that originate at the headend control office 10. This fiber optic plant 12 or infrastructure carries the modulated and channelized RF carriers that contain the video, data and telephony signals (36, 38 and 40 respectively) in bit stream form. A simplified schematic of the low-cost low-power remote node transceivers is 14 shown in FIG. 3. The remote node transceivers may be based on a single broadband booster amplifier that outputs approximately 20 mW of power per channel. This translates into 13 dBm/channel or equivalently −23 dBW/channel. Using a 16 dBi transmit antenna (either omni or sectored directional), an Effective Isotropic Radiated Power (EIRP) of 29 dBm/channel (or −1 dBW/channel) is broadcast. This varies dramatically from conventional LMDS architecture, which typically outputs 28–30 dBm/channel, or at least 50 times the required transmit power per channel as is required by the present invention. That conventional LMDS type of power is only available in Traveling Wave Tube (TWT) amplifiers for broadband transmissions or discrete channel solid state amplifiers. TWT's are renowned for their short life span and high cost, currently approximately $50K each. This seems likely not to improve much since the technology is World War II era and has been "tweaked" out in terms of cost/performance. Solid State amplifiers at 28 GHz are still very much in prototype stage for these kinds of power outputs. They are extremely limited in their bandwidth capability, have thermal dissipation problems and require a single amplifier for each RF channel. This implies 30+ solid state amplifiers (with expensive control circuitry) per LMDS node which affects cost, size, reliability and maintenance, all negatively when compared to the present invention's MWD equipment topography. Conventional LMDS in any event appears to be hard to justify economically, especially in regions of the country that have foliage and high rainfall rates.

With the MWD technology according to the present invention, implementation of the network is much simpler and cost effective since all signal processing is either performed at the headend or at subscriber locations. The small footprint of the remote node transceiver allows for a wide range of mounting alternatives and makes the concept feasible from both an economic and aesthetic perspective.

Figure 3:
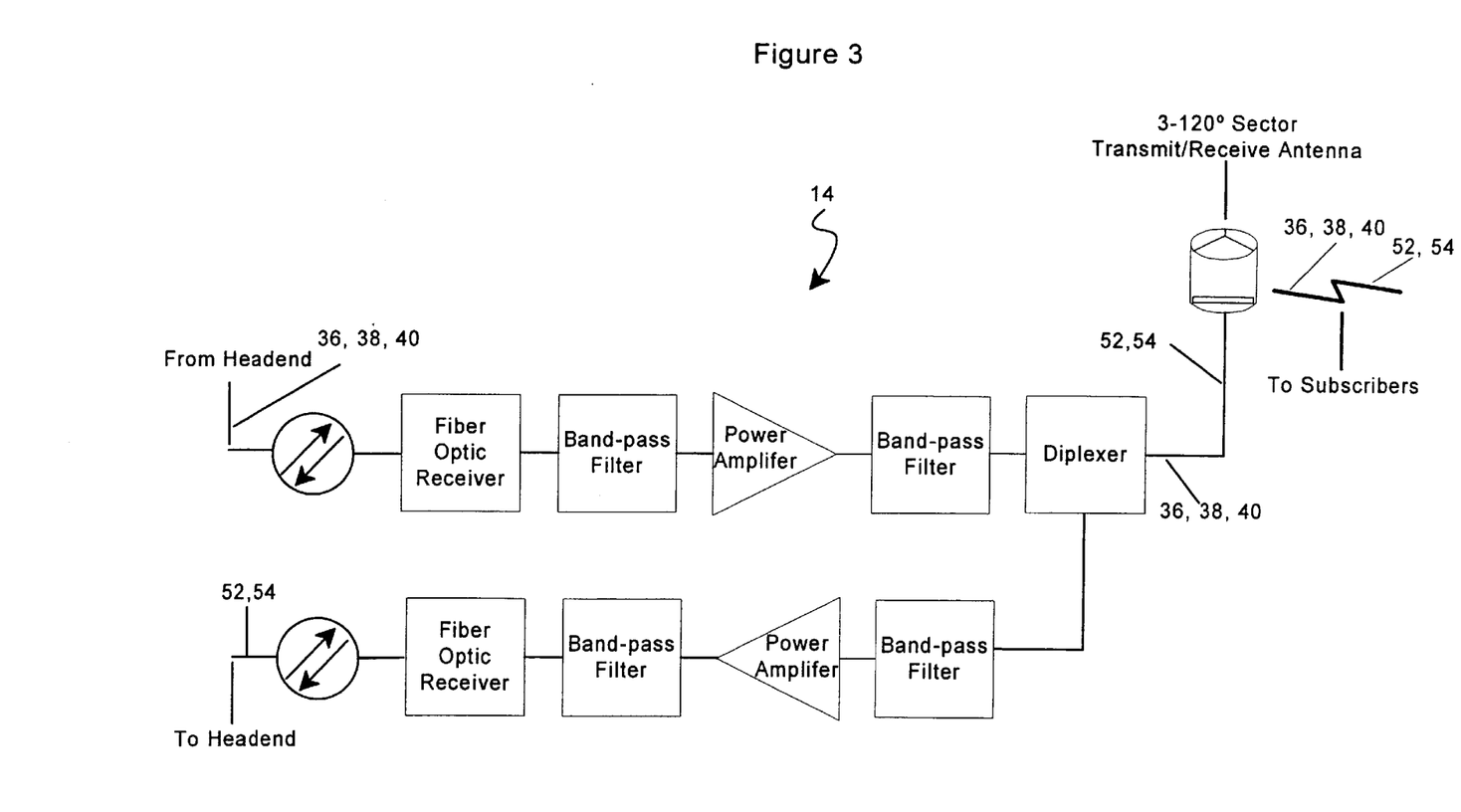
FIG. 3 is a schematic view of a preferred embodiment of a remote node transceiver according to the present invention.

Power may be supplied to the remote mode transceiver 14 by commercial 120 VAC @60 Hz. Additional backup power can be battery backup or generator backup located at the transceiver site. The backup power may be configured to power only the voice channels for emergency lifeline service. In order to use the backup power most efficiently, it may be desirable to switch off the video carriers and transmit/receive only the voice carriers. This can be performed several ways. From a design perspective, the simpler approach is to transmit voice on a separate fiber and maintain a separate path through the transceiver amplification chain. This approach is obviously the more expensive one, given the additional electronics both at the headend and the node transceiver, in addition to the extra infrastructure. Another broad approach is to include intelligence in the transceiver itself that automatically shuts off the video and data channels, passes the voice traffic and automatically adjusts the total broadband output power down to the level of the voice channel only. This may be performed by an automatic level control ("ALC") circuit in the transceiver architecture, although it adds extra cost and complexity to the transceiver.

The microcells preferably consist of at least three radiating sectors (120° each) and are cross polarized between adjacent cells to mitigate harmful interference due to the many transmitters in a given geographical area. The low power of the transmitters, the attenuation characteristics of foliage and building blockage, and the isolation gained by cross polarizing should prove adequate for reducing interfering signals in most cases. If desired, a four or more sector transceiver (90° each) could be implemented using cross polarization between adjacent sectors. The better isolation may be counteracted by increased cost and complexity, however.

Due to the potentially large number of transmitters deployed in the proposed scenarios, radio interference from adjacent nodes and multiple subscriber transceivers may substantially impact reliable operation. However, at the proposed frequency ranges foliage and terrain may be used advantageously when the system is being engineered to isolate the sources of interference. Additionally, due to the low power transmitters, directional receive antennas and the use of cross polarization discrimination for adjacent cells, it is conceivable that interference between node transceivers and subscribers may be negligible, allowing for frequency reuse factors of one. If so then the maximum efficiency in use of the spectrum can be obtained.

If interference does appear to be a problem in some areas, additional existing techniques can be employed that mitigate interference even further. For the downstream broadcast video portion of the spectrum, such techniques include simulcasting the broadcast signals by controlling the relative timing of signals at each transmitter and taking advantage of adaptive equalization in the set top to cancel out the interfering signals. S. Merrill Weiss, *Issues in Advanced Television Technology,* Focal Press, Boston 1996). This concept is new and was developed primarily for large cell multiple transmitter systems for Advanced Television (ATV) and Digital MMDS that are currently being built. In theory, the interference is canceled out since the interfering signal appears like multipath to the receiver. Use of the adaptive equalization techniques which are currently deployed in digital microwave systems makes this a readily available implementation that should prove cost effective. The downstream and upstream data and voice should be somewhat immune to interference due to the more robust modulation schemes proposed (QPSK, BPSK, etc.) for these services. If more rejection is required, the use of frequency reuse factors greater than one can be engineered which offers much greater performance at a price of more limited capacity. At the small transmission ranges proposed in the architecture, the decrease in customer capacity does not impact the service sets too severely.

Subscriber Station

Figure 4:
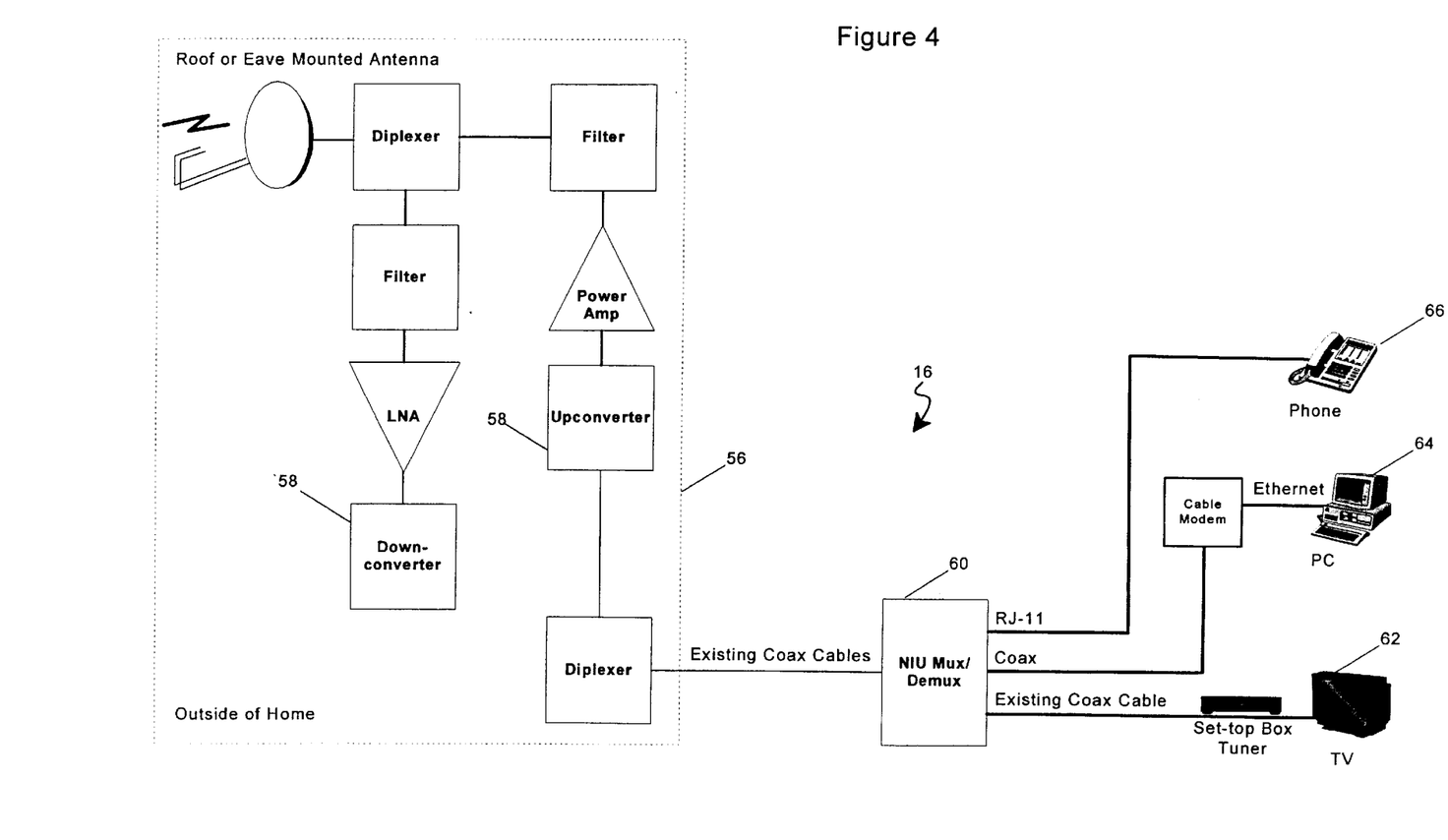
FIG. 4 is a schematic view of a preferred embodiment of a subscriber station according to the present invention.

Subscriber stations according to the present invention, a preferred embodiment of which is shown in schematic form in FIG. 4, include a small low profile antenna integrated with a subscriber transceiver 56 that includes a downconverter/upconverter 58 to convert the downstream video 36, data 38 and telephony 40 signals to a form which may be processed in the home, and to convert the upstream subscriber data 52 and voice 54 channels to the required RF. The antenna is relatively directional and may be of a type currently used with existing MMDS systems, being either a small planar array, corner reflecting dipole or parabolic reflector, among other designs. It is preferably high gain compared to an omni-directional monopole or "whip" antennae. The size of the antenna is directly related to the gain and sidelobe, and/or off-axis performance required. The up and downstream channels are preferably diplexed at both the front end and back end so that a single coaxial cable can feed a Network Interface Unit ("NIU") 60 which demultiplexes downstream signals, multiplexes upstream signals, and splits the signals to the proper interface or input/output device connections.

Figure 5:
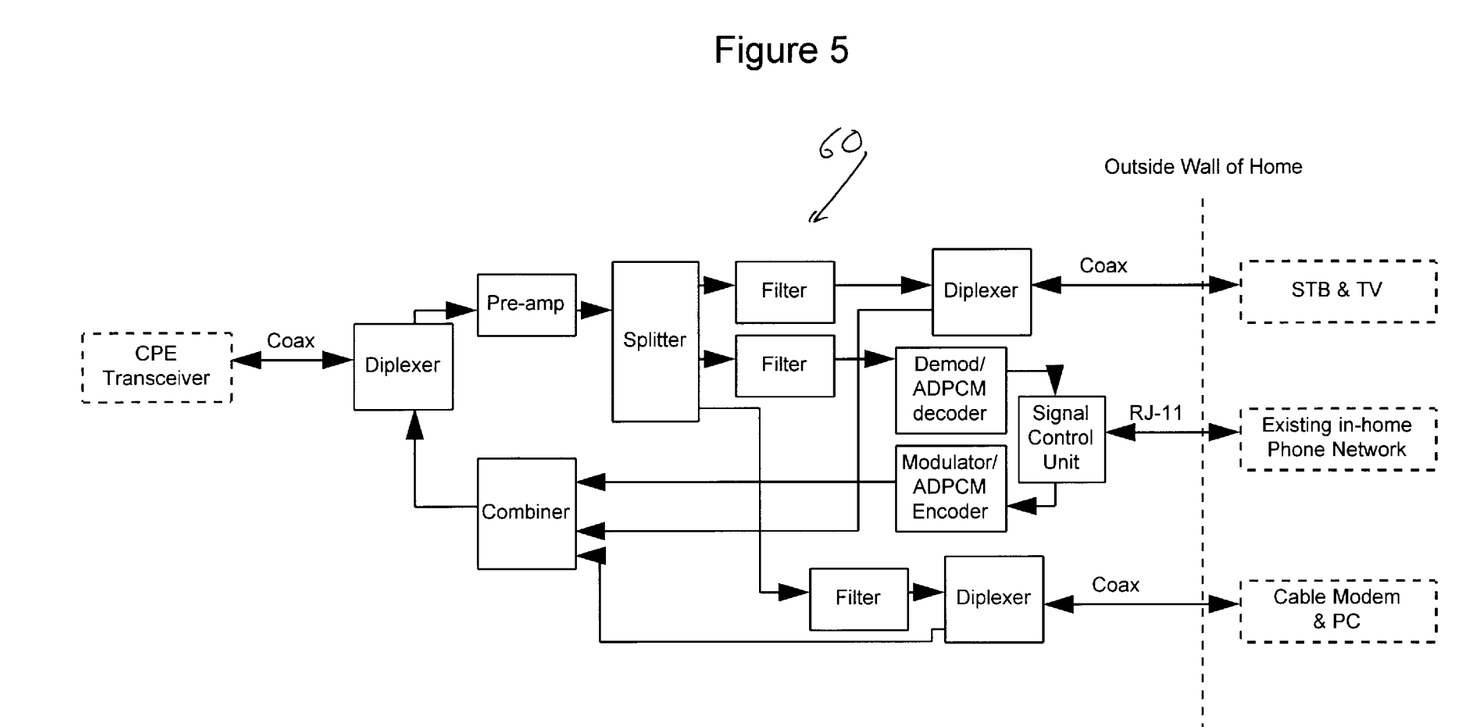
FIG. 5 is a schematic view of a subscriber Network Interface Unit according to the present invention.

An example NIU 60 is illustrated in FIG. 5. The NIU 60 is the component that exists outside the home (versus the HDT, which resides inside the set-top box) and connects the RF radio transport network to the respective individual service networks inside the home. The NIU 60 performs many functions that enable the subscriber to receive the various service sets (i.e. video, data and telephony) through the common network architecture. The NIU 60 takes advantage of lost-cost integrated circuitry to perform the functions of splitting and combining the bi-directional paths of the required signals both cost effectively and reliably. The NIU 60 also takes advantage of the existing in-house wiring for both video and telephony so that the logistics of re-wiring homes can be kept to a minimum.

FIG. 5 shows a signal received at the CPE Transceiver that is downconverted and sent via coax to the NIU 60. The NIU 60 sends the signal through a diplexer where the upstream and downstream signals are isolated and combined on a single coax. The output of the diplexer (downstream) is coupled to a pre-amp (if necessary) and then into a splitter that breaks the signal into three equivalent full spectrum outputs. The outputs of the splitter feed individual IF bandpass filters that reject all but the desired signals for the given service. At this point, the video signals are once again sent through a diplexer (for upstream/downstream separation) and feed a digital set top box via existing coax distribution cable. Likewise the data traffic goes through a diplexer where it feeds a cable modem which in turn is connected to a PC for high speed data applications, i.e. internet, at home banking, etc.

The telephony traffic is routed to a demodulator/ADPCM decoder chipset which is connected to a Signaling Control Unit (SCU) for access control, phone ring generation etc. The SCU communicates with the Headend Telephony Control Unit (HCT) for time slot assignment and control via the overhead in the telephony channel. The SCU outputs an analog RJ-11 for in-home telephony distribution. The SCU may conversely contain a small transceiver similar to a cordless phone base station that would connect to all handsets in the home wirelessly. Contention management may be handled by a contention management protocol such as slotted aloha.

For the case where only interactive video and data services are required (no voice), a single coaxial feed may be employed to offer both services with distribution being performed at a single point with a bi-directional splitter and amplifier. Services may be separated in frequency as they are in existing and planned HFC networks. Another technique that can be used to simplify the NIU 60 even further is the use of telephony return cable modems so that the NIU 60 would only be required to process video and voice with the return path being a voice-like channel that uses the same interfaces as the voice path. Depending on capacity and traffic management concerns, this may be done using a single time shared telephone line or multiple lines.

Using a subscriber antenna of 18 dBi gain (a typical 15"×15" 16-element flat planar array) and assuming 64 QAM modulation and the EIRP referenced in the Remote Node Transceiver section, predicted link margins show reliability approaching 100% with propagation related outages less than 1 minute per year at a distance of 1 mile. This type of statistical reliability is difficult to achieve in an LMDS environment under normal rain conditions. Another advantage of the MWD according to the present invention is the fact that low-gain antennas can be employed as opposed to the very high-gain antennas (32+dBi) required in an LMDS environment. This makes for much less stringent installation procedures. Also, the cost of a MMDS transceiver is substantially less than at 28 GHz due to the same reasons specified earlier for the remote node transceiver. Since the aggregate cost of subscriber equipment is the single highest cost of a wireless access network, even a savings of $10 per subscriber could negatively impact the capital costs by $10 million, assuming 1 million subscribers. Most likely, the cost of the subscriber transceiver alone may be on the order of several hundred dollars less than a comparatively equipped LMDS transceiver. This makes efficient provisioning of DS-0 POTS telephony to subscribers not only economically feasible but also extremely attractive when compared with the cost of doing likewise with LMDS technology.

The video signals 36 are disseminated over coaxial cable for in-house distribution to set-top decoders that feed television sets 62 or other video input/output devices. Likewise, the digital signals 38 may use ethernet or other appropriate protocol to connect to a PC, internet compatible device, or any other desired input/output device 64 that may be adapted to interface in interactive network sessions. Voice/telephony signals 40 are distributed via RJ-11 twisted pair to telephone sets, telecopiers, answering machines and other telephony input/output devices 66. The upstream subscriber data signals 52 and telephony signals 54 are also combined and processed in the NIU 60 for transmission back to the subscriber transceiver 56. Alternatively, some cost may be saved if the downstream and upstream signals are on dual or siamese coax from the NIU 60 to the subscriber transceiver 56, but this obviously requires additional cable and installation effort and expense.

A DC voltage may be placed on the coaxial cable by the NIU 60 to feed the transceiver downconverter and upconverter stages 58. The DC voltage may be isolated from the subscriber side of the NIU 60. Battery backup may also be contained within the NIU 60 and used for powering the sections of the subscriber transceiver 56 needed for the voice transmission from the transceiver 56 to the remote node transceiver 14. The battery may be adapted to power the NIU 60 voice card and allow for ringing as well as two-way voice communication. A solar panel at the antenna may be used to trickle charge the battery when not in use.

The foregoing is provided for purposes of explanation and illustration of a preferred form of the present invention. Modifications, deletions, additions and substitutions, such as, for instance, with respect to the frequencies used in accordance with the invention, may be made to the devices and processes disclosed in this document without departing from the scope or spirit of the invention.

What is claimed is:

1. A network for communicating a plurality of signals between a headend control office and a plurality of subscriber stations in full duplex, bi-directional fashion, comprising:

a. a headend control office containing headend signal processing circuitry for receiving a plurality of video signals from a plurality of video sources, and a plurality of digital signals from a plurality of digital sources, and transmitting said video and digital signals to a plurality of remote node transceivers via a network medium, and for receiving a plurality of subscriber signals from said remote node transceivers;

b. a plurality of remote node transceivers coupled to said headend control office via said network medium, each of said transceivers adapted to receive said video and digital signals, and transmit said signals, via radiofrequency carrier in a first band of microwave frequencies comprising a range of between substantially 2500 and 2686 Mhz, and in a plurality of sectors, to a plurality of said subscriber stations, and to receive from said subscriber stations via radiofrequency carrier a plurality of multiplexed subscriber signals in a second band of microwave frequencies comprising a range of between substantially 2150 to 2162 Mhz, and transmit said subscriber signals to said headend control office via said network medium;

c. a plurality of subscriber stations, arranged in cells, each cell of subscriber stations corresponding to one of said remote node transceivers, each of said subscriber stations comprising:

1. a subscriber transceiver adapted to receive said radiofrequency-transmitted video and digital signals from its corresponding remote node transceiver and to transmit said multiplexed subscriber signals to said remote node transceiver via radiofrequency carrier;

2. subscriber station signal processing circuitry adapted to couple said video and digital signals to video and digital input/output devices, respectively, and to receive subscriber signals from said input/output devices and couple said subscriber signals to said subscriber transceiver; and d. wherein a plurality of said subscriber transceivers are adapted to receive said radiofrequency-transmitted video and digital signals which are cross polarized with respect to radiofrequency signals which a plurality of other of said subscriber transceivers are adapted to receive.

2. A network according to claim 1 wherein the network medium comprises fiber optic links.

3. A network according to claim 2 wherein the headend control office comprises a plurality of satellite receivers for receiving video signals from satellite video transmissions and a plurality of broadcast receivers for receiving video signals from terrestrial video transmissions, and multiplexing circuitry, modulation circuitry and at least one fiber optic transmitter for multiplexing, modulating and transmitting said video and digital signals to said remote node transceivers via said fiber optic links.

4. A network according to claim 3 wherein at least some of the remote node transceivers comprise fiber optic receiver circuitry for receiving said video and digital signals, radiofrequency transmitter circuitry for transmitting said video and digital signals to said subscriber stations, radiofrequency receiver circuitry for receiving subscriber signals from said subscriber stations, fiber optic transmitter circuitry for transmitting said subscriber signals to said headend control office via said fiber optic links.

5. A network according to claim 3 wherein said subscriber station signal processing circuitry comprises a first diplexer circuitry adapted to separate said video and digital signals received from said subscriber transceiver from said subscriber signals, downconverter circuitry coupled to said first diplexer for downconverting said video and digital signals to a form adapted for transmission on coaxial cable, upconverter circuitry coupled to said first diplexer circuitry for upconverting said subscriber signals for coupling to said subscriber transceiver; and second diplexer circuitry for coupling said video and digital signals to said input/output devices and for coupling said subscriber signals to said upconverter.

6. A network for communicating a plurality of signals between a headend control office and a plurality of subscriber stations in full duplex, bi-directional fashion, comprising:
   a. a headend control office containing headend signal processing circuitry for receiving a plurality of video signals from a plurality of video sources, a plurality of digital signals from a plurality of digital sources, and a plurality of telephony signals from a public switched telecommunications network, and transmitting said video, digital and telephony signals to a plurality of remote node transceivers via a network medium, and for receiving a plurality of subscriber data and telephony signals from said remote node transceivers;
   b. a plurality of remote node transceivers coupled to said headend control office via said network medium, each of said transceivers adapted to receive said video, digital and telephony signals, and transmit said signals, via radiofrequency carrier in a frequency band of substantially 2500 to 2686 Mhz, and in a plurality of sectors, to a plurality of said subscriber stations, and to receive from said subscriber stations via radiofrequency carrier in a frequency band of substantially 2150 and 2162 Mhz a plurality of multiplexed subscriber data and telephony signals and transmit said subscriber signals to said headend control office via said network medium;
   c. a plurality of subscriber stations, arranged in cells, each cell of subscriber stations corresponding to one of said remote node transceivers, each of said subscriber stations comprising:
      1. a subscriber transceiver adapted to receive said radiofrequency-transmitted video, digital and telephony signals from its corresponding remote node transceiver and to transmit said multiplexed subscriber data and telephony signals to said remote node transceiver via radiofrequency carrier;
      2. subscriber station signal processing circuitry adapted to couple said video, digital and telephony signals to video, digital and telephony input/output devices, respectively, and to receive subscriber data and telephony signals from said input/output devices and couple said subscriber data and telephony signals to said subscriber transceiver; and
   d. wherein a plurality of said subscriber transceivers are adapted to receive said radiofrequency-transmitted video and digital signals which are cross polarized with respect to radiofrequency signals which a plurality of other of said subscriber transceivers are adapted to receive.

7. A network according to claim 6 wherein at least some of said remote node transceivers are adapted to receive said subscriber signals from said subscriber stations via frequencies in a band different from the band in which the remote node transceivers transmit said video, digital and telephony signals.

8. A network according to claim 6 wherein at least one subscriber station within a cell is adapted to transmit radiofrequency signals which are cross polarized with respect to radiofrequency signals which other subscriber stations within said cell are adapted to transmit.

9. A network according to claim 6 wherein all subscriber stations within at least one cell are adapted to transmit radiofrequency signals which are not cross polarized with respect to one another, but which are cross polarized with respect to radiofrequency signals transmitted by subscriber stations in other cells.

10. A network according to claim 6 wherein the network medium comprises fiber optic links.

11. A network according to claim 10 wherein the headend control office comprises a plurality of satellite receivers for receiving video signals from satellite video transmissions, a plurality of broadcast receivers for receiving video signals from terrestrial video transmissions, interconnection circuitry coupled to a public switched telecommunications network coupling telephony signals to said headend control office, and multiplexing circuitry, modulation circuitry and at least one fiber optic transmitter for multiplexing, modulating and transmitting said video, digital and telephony signals to said remote node transceivers via said fiber optic links.

12. A network according to claim 10 wherein at least some of the remote node transceivers comprise fiber optic receiver circuitry for receiving said video, digital and telephony signals, radiofrequency transmitter circuitry for transmitting said video, digital signals and telephony signals to said subscriber stations, radiofrequency receiver circuitry for receiving subscriber data and telephony signals from said subscriber stations, and fiber optic transmitter circuitry for transmitting said subscriber signals to said headend control office via said fiber optic links.

13. A network according to claim 10 wherein said signal processing circuitry comprises first diplexer circuitry adapted to separate said video, digital and telephony signals received from said subscriber transceiver from said subscriber signals, downconverter circuitry coupled to said first diplexer for downconverting said video, digital and telephony signals to a form adapted for transmission on coaxial cable, upconverter circuitry coupled to said first diplexer circuitry for upconverting said subscriber signals for coupling to said subscriber transceiver; and second diplexer circuitry for coupling said video, digital and telephony signals to said input/output devices and for coupling said subscriber signals to said upconverter.

14. A network according to claim 6 in which the subscriber station further comprises interface circuitry coupled to said second diplexer via coaxial cable, and is adapted to separate and route to appropriate input/output devices said video, digital and telephony signals.

15. A network for communicating a plurality of signals between a headend control office and a plurality of subscriber stations in full duplex, bi-directional fashion, comprising:
   a. a headend control office containing headend signal processing circuitry for receiving a plurality of video signals from a plurality of video sources, a plurality of digital signals from a plurality of digital sources, and a plurality of telephony signals from a public switched telecommunications network, and transmitting said video, digital and telephony signals to a plurality of remote node transceivers via a plurality of fiber optic links and for receiving a plurality of subscriber data and telephony signals from said remote node transceivers, said circuitry comprising a plurality of satellite receivers for receiving video signals from satellite video transmissions, a plurality of broadcast receivers for receiving video signals from terrestrial video transmissions, interconnection circuitry coupled to a public switched telecommunications network coupling telephony signals to said headend control office, and multiplexing circuitry, modulation circuitry and at least one fiber optic transmitter for multiplexing, modulating and transmitting said video, digital and telephony signals to said remote node transceivers via said fiber optic links;

b. a plurality of remote node transceivers coupled to said headend control office via said network medium, each of said transceivers adapted to receive said video, digital and telephony signals, and transmit said signals, via radiofrequency carrier in a frequency band of substantially 2500 to 2686 Mhz, and in a plurality of sectors, to a plurality of said subscriber stations, and to receive from said subscriber stations via radiofrequency carrier in a band of substantially 2150 to 2162 Mhz a plurality of multiplexed subscriber data and telephony signals and transmit said subscriber signals to said headend control office via said fiber optic links, said remote node transceivers comprising fiber optic receiver circuitry for receiving said video, digital and telephony signals, radiofrequency transmitter circuitry for transmitting said video, digital signals and telephony signals to said subscriber stations, radiofrequency receiver circuitry for receiving subscriber data and telephony signals from said subscriber stations, and fiber optic transmitter circuitry for transmitting said subscriber signals to said headend control office via said fiber optic links;

c. a plurality of subscriber stations, arranged in cells, each cell of subscriber stations corresponding to one of said remote node transceivers, each of said subscriber stations comprising:

1. a subscriber transceiver adapted to receive said radiofrequency-transmitted video, digital and telephony signals from its corresponding remote node transceiver and to transmit subscriber data and telephony signals to said remote node transceiver via radiofrequency carrier;

2. subscriber station signal processing circuitry adapted to couple said video, digital and telephony signals to video, digital and telephony input/output devices, respectively, and to receive subscriber data and telephony signals from said input/output devices and couple said subscriber data and telephony signals to said subscriber transceiver, said signal processing circuitry comprising first diplexer circuitry adapted to separate said video, digital and telephony signals received from said subscriber transceiver from said subscriber signals, downconverter circuitry coupled to said first diplexer for downconverting said video, digital and telephony signals to a form adapted for transmission on coaxial cable, upconverter circuitry coupled to said first diplexer circuitry for upconverting said subscriber signals for coupling to said subscriber transceiver; and second diplexer circuitry for coupling said video, digital and telephony signals to said input/output devices and for coupling said subscriber signals to said upconverter; and d. wherein a plurality of said subscriber transceivers are adapted to receive said radiofrequency-transmitted video and digital signals which are cross polarized with respect to radiofrequency signals which a plurality of other of said subscriber transceivers are adapted to receive.

16. A network according to claim 15 wherein at least one subscriber station within a cell is adapted to transmit radiofrequency signals which are cross polarized with respect to radiofrequency signals which other subscriber stations within said cell are adapted to transmit.

17. A network according to claim 15 wherein all subscriber stations within at least one cell are adapted to transmit radiofrequency signals which are not cross polarized with respect to one another, but which are cross polarized with respect to radiofrequency signals transmitted by subscriber stations in other cells.

18. A network according to claim 15 in which the remote node transceivers and said subscriber stations contain power backup circuitry for assuring reliability of the network to transmit and receive said telephony signals.

19. A network according to claim 15 comprising modulation circuitry adapted for modulating said telephony signals in a manner that ensures telephonic communications.

20. A network according to claim 15 in which the subscriber station further comprises interface circuitry coupled to said second diplexer via coaxial cable, and is adapted to separate and route to appropriate input/output devices said video, digital and telephony signals.

21. A network according to claim 15 in which said video signals are coupled to an input/output device comprising analog video circuitry and a remote control for generating subscriber data signals.

22. A network according to claim 15 in which said video signals are coupled to an input/output device comprising a keyboard for generating subscriber data signals.

23. A network according to claim 15 in which said digital signals are coupled to an input/output device comprising analog video circuitry.

24. A network according to claim 15 in which said digital signals are coupled to an input/output device comprising analog video circuitry, digital video circuitry, and a keyboard for generating subscriber data signals.

25. A network according to claim 15 in which said digital signals are coupled to an input/output device comprising a computer.

26. A network according to claim 15 in which said digital signals are coupled to an input/output device adapted to input and output internet-compatible signals.

27. A network according to claim 15 in which said digital signals are coupled to an input/output device adapted to input and output data signals in a session on a network.

* * * * *